Patented Apr. 21, 1925.

1,534,819

UNITED STATES PATENT OFFICE.

RUTGER HENRIK von SETH, OF STOCKHOLM, SWEDEN.

PROCESS FOR OBTAINING VANADIUM COMPOUNDS OR VANADIUM FROM PIG IRON CONTAINING VANADIUM.

No Drawing.   Application filed January 25, 1924.   Serial No. 688,608.

*To all whom it may concern:*

Be it known that I, RUTGER HENRIK VON SETH, mining engineer, a subject of the King of Sweden, residing at Engelbrektsgatan 6$^B$, Stockholm, in the Kingdom of Sweden, have invented certain new and useful improvements in processes for obtaining vanadium compounds or vanadium from pig iron containing vanadium; and I do hereby declare the following to be a full, clear, and exact description of the invention, such as will enable others skilled in the art to which it appertains to make and use the same.

In the reduction of iron ores containing vanadium, the greatest part of the vanadium, as we know, enters into the pig iron, but afterwards enters completely into the slag on the refinement of the iron. The content of vanadium in the finery slag is too low to enable vanadium to be extracted or obtained out of the slag at a profit (i. e. for industrial or commercial purpose) because rich vanadium ores are now available in the natural state, which can be used more cheaply for the aforesaid purpose than such slag.

The present invention is based on the observation made by me in studying the fining process, that the vanadium, owing to its great affinity for oxygen, is very rapidly converted into slag in the fining process. Thus, for example, if Thomas pig iron with 0,20% vanadium is refined in a basic converter, only small traces of the vanadium will be left in the iron bath after the blast has continued for two or three minutes. The object of the present invention is to preserve the high vanadium slag formed at the beginning of the fining process, by discontinuing the process at a moment before the iron is decarburized when the vanadium, as shown by experience, is entirely or substantially converted into slag, whereupon the iron and the slag are tapped and separated from one another, the iron being tapped into another furnace and completely refined. The process is thus a duplex process.

In the fining of pig iron containing vanadium and rich in phosphorus, the first part of the process is performed in a furnace with either acid or basic lining. In the former case the slag will be free from phosphorus or at any rate low in phosphorus, which simplifies its preparation or conversion into ferro-vanadium. In the latter case soda can be added before the commencement of the fining, which will cause the vanadium to enter the slag as a sodium vanadate, which can be directly extracted with water. The fining process is completed in a basic furnace after the addition of lime, and eventually also of silicon or manganese if this should be necessary in order to raise the temperature of the iron bath.

The separation of the high-vanadium slag from the iron and the transference of the latter from the first furnace to the second furnace may also be carried out in the following manner:—The iron and as much of the slag as inevitably follows along with it is tapped into a ladle, whereupon the remaining slag is tapped into another container. That part of the slag which has followed along with the iron in the tapping of the latter, is stiffened with lime, rabbled or skimmed off, whereupon the iron is poured into the second furnace.

When the pig iron mixers are employed, a larger or smaller part of the vanadium enters into the mixer slag, whence it is advisable in this case to perform the first stage of the process before the pig iron is poured into the mixer, or else to perform the first stage of the fining process in the mixer itself.

The result of the present process is thus to obtain from the pig iron vanadium in the form of a high-vanadium slag, which in accordance with known methods can be further treated or prepared with technically and economically satisfactory results for the manufacture of vanadium compounds or of vanadium. The quantity of the vanadium slag formed is small, due to the interruption of the process and consequently the percentage of vanadium (or vanadium acid) in such slag becomes very high (about 10% in the case of Thomas pig iron containing 20% of vanadium). If, on the contrary, the slag were not tapped at said early stage the percentage of vanadium in the slag would, on account of the greater quantity of the slag thus obtained, not be higher than about 2%, which slag would be too poor in vanadium for use in an economical way as raw material for obtaining vanadium.

The moment when the whole or greatest part of the vanadium has passed into the slag is as stated above found out by experience in each case. For instance, when a certain material is to be treated a trial blast is carried out, for instance for 2 minutes, and a sample of the slag and the iron is tested by analyzing its vanadium content. Thereafter a new trial blast is carried out, for instance for 3 minutes, and a sample tested in the same way. From the result the proper time of blast, i. e., when the whole or at least the greatest part of the vanadium has passed into the slag, is found out, and by guidance of this result the working is then continued in proper manner.

Having thus described my invention I declare that what I claim is:

1. In a process for fining pig iron, rich in vanadium, the method of obtaining a slag rich in vanadium which comprises interrupting the fining of the pig iron at a moment before the iron is decarburized and when the vanadium has substantially passed into the slag, separating the slag from the iron and afterwards completely fining the iron, whereby there is obtained a high vanadium slag which may be used for the production of vanadium or vanadium compounds.

2. In a process for fining pig iron, rich in vanadium, the method of obtaining a slag rich in vanadium which comprises interrupting the fining of the pig iron at a moment before the iron is decarburized and when the vanadium has substantially passed into the slag, separating the slag from the iron and afterwards completely fining the iron, in a separate furnace, whereby there is obtained a high vanadium slag which may be used for the production of vanadium or vanadium compounds.

3. The process of treating pig iron containing vanadium and being rich in phosphorus, in accordance with claim 1, and in which the initial fining is conducted in a furnace with acid lining.

In testimony whereof I affix my signature.

RUTGER HENRIK von SETH.

Witnesses:
E. NILON,
ING. HAGELEN.